United States Patent Office 3,134,736
Patented May 26, 1964

3,134,736
LUBRICATING COMPOSITIONS
Robert J. Sarraf and Ernest G. Steele, Pittsburgh, Pa., assignors to Rockwell Manufacturing Company, Pittsburgh, Pa., a corporation of Pennsylvania
No Drawing. Filed May 2, 1961, Ser. No. 107,054
9 Claims. (Cl. 252—28)

This invention relates to lubricating compositions, and more particularly to lubricants capable of operating over relatively wide temperature ranges without deterioration when exposed to gasoline, oil and the like substances.

Briefly, the present invention includes novel lubricants suitable for use in the lubrication of plug valves in particular, as well as for other applications in fuel and oil systems of aircraft for example. Surprisingly good results have been achieved by the present lubricants employed in aviation gasoline lines where minor quantities of water are also found, and temperatures vary widely. The present compositions have a saturated polyester resin base fluid thickened with an inorganic, ion exchanged clay, or soap, and may further include an oxidation and corrosion inhibitor as will be described.

For any particular service use, a lubricant must be capable of resisting deterioration or chemical reaction due to the conditions imposed upon it by the service. This is particularly true for example, in lubricated valve service where the lubricant must be operative over wide temperature ranges, must resist attack from various line fluids, and must in some valve designs withstand the considerably higher pressures required to jack or lift the plugs from their seats in event of freezing or sticking due to corrosion or failure to relubricate adequately. Additionally, the lubricant must be capable of providing an effective valve seal which will withstand pressures and stresses of distribution through tortuous channels and over the surfaces to be sealed.

The compositions of the present invention are particularly adaptable to services wherein it is required that the lubricant possess high thermal stability and be especially resistant to liquid hydrocarbons such as liquid fuel and related products and to aqueous mixtures therewith.

Prior to this invention lubricants have been formulated by adding a reacted bentonite clay thickener to synthetic base fluid ingredients as shown for example in U.S. Patent No. 2,662,059 to McCarthy wherein it is disclosed that esters having viscosities of about 45 to 4,000 SUS at 100° F. may be thickened with a bentonite compound composed of a montmorillonite mineral in which at least a part of the cation content of the mineral has been replaced by such organic bases as aliphatic amines, their salts, and quaternary ammonium salts. However, the prior art lubricants have not utilized saturated polyester resins as in the present invention and have therefore, been found unsuitable for service in handling a stream of liquid fuel such as aviation gasoline or the like, where radiant heat may create temperatures in the order of 150° F. and where it is found that such streams frequently contain water as a result of condensation or alcohol as a means of preventing lines from freezing. It is apparent that in such service the lubricant must have a high thermal stability, must resist deteriorating attack from water, alcohol, and the line fluid fuel, should also inhibit corrosion, and yet be capable of performing all the functions of a good lubricating and sealing composition.

Accordingly, it is an object of the present invention to provide novel lubricating compositions which embody a saturated polyester base ingredient and a thickener in an amount sufficient to impart a grease-like consistency to the composition.

It is another object of the present invention to provide novel lubricating compositions wherein a saturated polyester resin is thickened with a compatible soap or ion exchanged clay such as for example, bentonite, attapulgite, nontronite, illite, saponite, zeolite, and fuller's earth, reacted with an organic base, particularly an alkyl, aryl, ammonium halide.

Another object of the present invention is to provide compositions mentioned in the preceding paragraph which possess high thermal stability and solvent resistance, and which may further include a corrosion and oxidation inhibitor and/or plasticizer.

Other objects and advantages of the present invention will become apparent to those skilled in this art from the following description and appended claims.

The base ingredient for each lubricant of the present invention is a saturated polyester fluid resin which may be formed by the reaction of a dicarboxylic acid or its anhydride and a saturated dihydroxy alcohol. The dicarboxylic acid or anhydride may be defined by the general formula $R(COOH)_2$ or $R(CO)_2O$ where R may be an aliphatic group containing 1 to 8 carbon atoms, a phenyl radical, or a phenyl radical in combination with an aliphatic group containing 1 to 8 carbon atoms. Examples of suitable acids are succinic, adipic, azelaic, sebacic, phthalic and phenylene diacetic acid. Saturated dihydroxy alcohols make up a class of compounds familiar to those skilled in this art and include for example, propylene glycol, diethylene glycol, ethylene glycol, and dipropylene glycol. Similarly, chain stopping or polymerization inhibition may be utilized in the production of the polyester resin by well known means such as for example by addition at the desired stage, of a monofunctional acid or alcohol to produce a stable saturated resin of the desired viscosity. A preferred base material is Paraplex G-41, currently marketed and produced by Rohm and Haas, which has been found to provide exceptionally good results. Paraplex G-41 has the following characteristics:

Acid number _____ 2.0 max.
Viscosity (50% in EDC) _____ G-K
Specific gravity (25° C.) _____ 1.132
Refractive index (25° C.) _____ 1.4696
Solidification temp. _____ ° C__ −25

The present compositions are preferably thickened with an ion exchanged bentonitic clay reacted with an alkyl aryl ammonium halide; however, other suitable clay thickeners are those described for example in U.S. Patent No. 2,531,440 to Jordon, issued November 28, 1950, and U.S. Patent No. 2,531,427 to Hauser, issued November 28, 1950. Examples of organic base compounds and their salts useable in the practice of this invention are salts of aliphatic, cyclic, heterocyclic, and aromatic amines; primary, secondary, and tertiary amines and polyamines; also quaternary ammonium compounds, as well as other monovalent or polyvalent onium compounds. Compatible soap thickeners are also useable in the present compositions; these may include for example lithium hydroxystearate, and barium hydroxystearate.

It has been discovered, in accordance with the present invention that lubricants suitable for service under the above described conditions, i.e., resistant to alcohol, water, liquid fuels, and relatively high temperatures, and suitable for certain government specification requirements, may be formulated from a saturated polyester resin and thickener alone, although certain ones preferably contain additional thickeners and additives such as corrosion inhibitors and plasticizers.

Surprisingly good results have been obtained by adding an ion exchanged bentonite (preferably hectorite) clay reacted with an alkyl, aryl, ammonium halide, especially dimethyl alkyl benzyl ammonium chloride such as Baragel 24 or Baragel 27 currently produced and marketed by Baroid Chemicals, Inc., to Paraplex G–41. The aryl radical seems to be of particular significance in thickening the resin in view of the outstanding properties the resulting lubricant exhibits. The reason for the effectiveness of the aryl-radical thickener is at this time not completely known, however.

The preferred composition of this invention is illustrated as follows:

| Example I-A | Preferred Range, p.b.w. | Preferred Amount, p.b.w. |
|---|---|---|
| Saturated polyester resin (Paraplex G–41) | 70–95 | 90 |
| Ion exchanged clay (Baragel 24) | 5–30 | 10 |

The ingredients are mixed and heated to 250° F. The lubricant is drawn off after complete mixing and milled while still warm (at approximately 200° F.).

In addition to bulk form, lubricants compounded in stick form are commonly used in this art. The lubricant stick is such that it may be introduced into service in a lubricated valve through the valve stem and for this reason should be less tacky than bulk lubricants. A lubricant which has been found highly suitable for stick dispensing to valves and which possesses the desirable properties of being resistant to solvents, fuels, and relatively high temperatures is:

Example I–B:                                          P.b.w.
   Saturated polyester resin _____ 45–80
   Lithium hydroxystearate _____ 10–25
   Ion exchanged clay (Baragel-24) _____ 5–15
   Propylene carbonate _____ 5–15

This composition was formulated in the manner of the Example I–A formulation. The use of lithium hydroxystearate and other soaps in combination with a plasticizer such as propylene carbonate was found very desirable. The unworked penetration of this composition was less than that of the Example I–A lubricant but was not lower than 50 mm. and therefore satisfactory.

The Example I–A lubricant was found particularly suitable for service under requirements established by Military Specification MIL–G–6032A. Results of tests made in accordance with these requirements are:

| Test | Specification requirement | Test results |
|---|---|---|
| Material | Smooth and homogeneous mixture consisting essentially of a suitable gelling agent with vegetable oils, glycerols and/or synthetic oils. | Passes. |
| Unworked penetration, min. | 100 | 216. |
| Worked penetration, max. | 310 | 250. |
| Corrosion on copper | No pitting or staining on copper strip. | Passes. |
| Dropping point, min. | 260 | 400+. |
| Solubility in fuel, max., percent. | 20 | 5.0. |
| Resistance to fuel | No loss of adhesion, cracking, swelling, blistering, or other evidence of deterioration. | Passes. |
| Resistance to aqueous solutions. | No disintegration | Do. |
| Film stability and corrosion on steel. | One week exposure to 212° F. without forming a hard resinous deposit or evidence of corrosion on steel panel. | Do. |
| Storage stability | 120 days exposure to 130° F. without serious change in physical properties. | Do. |

To further improve oxidation and corrosion characteristics of the composition set out in Example I–A, it has been found that about 0.1% polymerized tri-methyl dihydroquinoline is very effective. And, as a secondary plasticizer and body improver, propylene carbonate may be used to advantage in minor amounts of about 2–3 parts by weight.

Other highly suitable lubricants formulated in accord with the present invention embodying Paraplex G–41 and having relative ingredient amounts indicated in parts by weight are:

| Example number | 2 | 3 | 4 | 5 | 6 | 7 | 8 |
|---|---|---|---|---|---|---|---|
| Paraplex G–14 | 90 | 85 | 85 | 85 | 85 | 85 | 75 |
| Aluminum hydroxystearate | 15 | | | | | | |
| Aluminum stearate | | 15 | | | | | |
| Lithium stearate | | | 15 | | | | |
| Lithium hydroxystearate | | | | 15 | | 13.6 | 10 |
| Bentone 34 | | | | | 20 | | |
| Calcium hydroxystearate | | | | | | 1.6 | |
| Attagel 10 (modified attapulgus clay) | | | | | | | 25 |

Where solvent resistance is less essential compositions utilizing Paraplex G–25 or G–40 as a base ingredient have been found highly effective in that they exhibit a low pour point and good thermal stability. Illustrative of these compositions are the following:

| Example number | 9 | 10 | 11 | 12 | 13 | 14 | 15 | 16 | 17 | 18 | 19 |
|---|---|---|---|---|---|---|---|---|---|---|---|
| Paraplex G–40 | | 85 | 85 | 85 | 85 | 85 | 85.5 | 45 | 85 | | |
| Paraplex G–25 | 75 | | | | | | | 60 | | 85 | 85 |
| Lithium hydroxystearate | 10 | 15 | | | 10 | 10 | | | | 15 | 10 |
| Zinc hydroxystearate | | | 15 | | | | | | | | |
| Zinc stearate | | | | 15 | | | | | | | |
| Micro silica | | | | | 5 | 5 | 2 | | 5 | | |
| Propylene carbonate | | | | | | | 2.5 | | | | |
| Bentone 34 | | | | | | | | 35 | | | |
| Barium hydroxystearate | | | | | | | | | 10 | | |
| Lithium stearate | | | | | 10 | | | | | | |
| Bentone 18C | | | | | | | | | | | 15 |
| Attagel 10 | 25 | | | | | | | | | | |

Other saturated polyester resin base ingredients which may be utilized are Selectron 5200, 775–56 and Glycol Resin S1614, or if desired, the ingredient may be prepared by reacting a polyhydric alcohol with a polybasic acid anhydride such as diethylene glycol and phthalic anhydride.

Selectron 5200, 775–56, a product of Pittsburgh Plate Glass Co., is a polyester resin of the copolymer type generally used for impregnating laminating, casting, or molding operations. A satisfactory lubricant may be formulated by mixing Selectron (85 parts by weight) with barium hydroxystearate (15 parts by weight) and 1 part ethyl zimate as an inhibitor. The latter is added to reduce the corrosion tendency of the composition and increase its thermal stability. The resultant lubricant has good thermal stability and solvent resistance.

A base fluid ingredient may be prepared by reacting a dicarboxylic acid and dihydroxy alcohol in the following manner. Diethylene glycol and phthalic anhydride reacted in mole for mole amounts until the refractive index of the product reaches 1.5420–1.5457 at 20° C. By reacting the resin for a sufficiently long time (until refractive index exceeds 1.5419) a high viscosity and lower acid number product is produced, thus reducing the corrosion capabilities thereof. Thereafter, the resinous product can be mixed with a compatible soap such as lithium hydroxystearate or barium hydroxystearate and a corrosion inhibitor such as ethyl zimate. Illustrative formulations follow:

| Example 20 | Preferred range, p.b.w. | Preferred amount |
|---|---|---|
| Polyester reaction product of a dicarboxylic acid and dihydroxy alcohol | 60–90 | 80 |
| Soap (e.g. lithium hydroxystearate) | 10–40 | 20 |
| Inhibitor (e.g. ethyl zimate) | About 0.1–2.0% | 0.1 |

The composition may be mixed in the manner explained in connection with Example I–A.

Other inhibitors are, zinc diethyl dithio carbamate sodium glyceroxide, (DETA) diethylenetriamine, and (TEAP) triethanolamine phosphate, for example. Tests have shown that inhibitors in concentrations up to 2% may be used.

| Example number | 20 | 21 | 22 | 23 | 24 | 25 | 26 |
|---|---|---|---|---|---|---|---|
| Reaction product of Example 18 | 75 | 70 | 71 | 85 | 85 | 75 | 70 |
| Lithium hydroxy stearate | 19 | 18 | 18 | | | 19 | 18 |
| Polytetrafluoroethylene dispersion | 0.2 | 0.1 | 0.1 | | | | 0.1 |
| Sodium glyceroxide | 0.2 | | | | | 0.1 | |
| TEAP | | 1.0 | | | | 0.2 | 1.0 |
| Versamid 940 | | 3.0 | | | | | |
| Propylene carbonate | | | 10 | 10 | | 10 | 5 | |
| Barium hydroxystearate | | | | 15 | 15 | | |
| Castor oil | | | | | | | 10 |

The same reaction product described in connection with Example 18 but with a refractive index of 1.5419 and acid number of 36.3 mg. KOH/gm. was utilized in the following six examples.

| Example number | 27 | 28 | 29 | 30 | 31 | 32 |
|---|---|---|---|---|---|---|
| Reaction product | 85 | 85 | 85 | 85 | 95 | 85 |
| Lithium hydroxystearate | 15 | | | | | 10 |
| Zinc stearate | | 15 | | | | |
| Zinc hydroxystearate | | | 15 | | | |
| Barium hydroxystearate | | | | 15 | | |
| Micro silica | | | | | 5 | 5 |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. The lubricating composition consisting essentially of: a major amount of a saturated polyester resin formed by reacting a saturated dihydroxy alcohol with a member of the group consisting of dicarboxylic acids having the formula $R(CCOH)_2$ and anhydrides thereof having the formula $R(CO_2)O$, where R represents a radical selected from the group consisting of aliphatic compounds containing from 1 to 8 carbon atoms, phenyl, and phenyl combined with an aliphatic compound containing from 1 to 8 carbon atoms; and a thickener in an amount sufficient to impart a grease-like consistency to said composition, said thickener being the reaction product of an organic base and a clay selected from the group consisting of atapulgite, bentonite, nontronite, saponite, zeolite, and fuller's earth.

2. The composition as defined in claim 1, wherein said saturated polyester resin is present in about 60–95, and said thickener 5–40, parts by weight.

3. A lubricating composition of matter as defined in claim 1 further including a minor amount of polymerized trimethyl di-hydroquinoline.

4. The lubricating composition consisting essentially of: a major amount of a saturated polyester resin formed by reacting a saturated dihydroxy alcohol with a member of the group consisting of dicarboxylic acids having the formula $R(CCOH)_2$ and anhydrides thereof having the formula $R(CO_2)O$, where R represents a radical selected from the group consisting of aliphatics containing from 1 to 8 carbon atoms, phenyl, and phenyl combined with an aliphatic containing from 1 to 8 carbon atoms; and a thickener in an amount sufficient to impart a grease-like consistency to said composition selected from the group consisting of lithium hydroxystearate, lithium stearate, zinc stearate, zinc hydroxystearate, barium hydroxystearate, calcium hydroxystearate, aluminum hydroxystearate, and aluminum stearate.

5. The lubricating composition of matter comprising 40–80 percent of a saturated polyester resin formed by reacting a saturated dihydroxy alcohol with a member of the group consisting of dicarboxylic acids having the formula $R(COOH)_2$ and anhydrides thereof having the formula $R(CO)O$, where R represents a radical selected from the group consisting of aliphatics containing from 1 to 8 carbon atoms phenyl, and phenyl combined with an aliphatic containing from 1 to 8 carbon atoms, approximately 10–25 percent of a compatible soap thickener, and approximately 5–15 percent of a reaction product of a bentonite and an organic nitrogen base.

6. The lubricating composition of matter of claim 5 further comprising 5–15 percent of propylene carbonate.

7. The lubricating composition as defined in claim 6, wherein said soap is lithium hydroxystearate.

8. The lubricating composition of claim 5 further comprising up to about 2.0 percent of an antioxidant.

9. The lubricating composition defined in claim 8, wherein said soap is selected from the group consisting of lithium hydroxystearate, lithium stearate, zinc stearate, zinc hydroxystearate, barium hydroxystearate, calcium hydroxystearate, aluminum hydroxystearate, and aluminum stearate.

References Cited in the file of this patent

UNITED STATES PATENTS

| | | |
|---|---|---|
| Re. 23,243 | Bondi | June 20, 1950 |
| 2,448,567 | Zisman | Sept. 7, 1948 |
| 2,531,427 | Hauser | Nov. 28, 1950 |
| 2,610,959 | Nordlander | Sept. 16, 1952 |
| 2,662,059 | McCarthy | Dec. 8, 1953 |
| 2,723,957 | Morway et al. | Nov. 15, 1955 |
| 2,766,205 | Marshall et al. | Oct. 9, 1956 |
| 2,885,360 | Haden et al. | May 5, 1959 |
| 2,887,461 | Hort | May 19, 1959 |
| 2,939,840 | Fronczak | June 7, 1960 |
| 2,990,367 | Sawyer et al. | June 27, 1961 |

UNITED STATES PATENT OFFICE
CERTIFICATE OF CORRECTION

Patent No. 3,134,736            May 26, 1964

Robert J. Sarraf et al.

It is hereby certified that error appears in the above numbered patent requiring correction and that the said Letters Patent should read as corrected below.

Column 6, line 26, for "R(CO)O" read -- $R(CO_2)O$ --.

Signed and sealed this 29th day of September 1964.

SEAL)
Attest:

RNEST W. SWIDER            EDWARD J. BRENNER
ttesting Officer            Commissioner of Patents